United States Patent [19]

Ronzoni

[11] Patent Number: 5,067,735
[45] Date of Patent: Nov. 26, 1991

[54] CLAMPING DEVICE FOR LOCKING THE WORKPIECE-CARRYING COLLET IN AUTOMATIC MACHINE TOOLS

[75] Inventor: Enrico Ronzoni, Bergamo, Italy

[73] Assignee: Gildemeister Italiana S.p.A., Brembate Sopra, Italy

[21] Appl. No.: 557,088

[22] Filed: Jul. 23, 1990

[30] Foreign Application Priority Data

Oct. 20, 1989 [IT] Italy .................... 22079 A/89

[51] Int. Cl.⁵ .................................. B23B 31/20
[52] U.S. Cl. .................................. 279/1 F; 279/1 Q; 279/50; 279/51
[58] Field of Search ............... 279/1 F, 1 Q, 37, 38, 279/50, 51, 57, 58

[56] References Cited

U.S. PATENT DOCUMENTS 2,252,839  8/1941  Drissner .................... 279/1 F
2,729,076  1/1956  Thomson .................... 279/1 Q Primary Examiner—Steven C. Bishop
Attorney, Agent, or Firm—Ladas & Parry

[57] ABSTRACT

A clamping device for locking the workpiece-carrying collet of an automatic machine tool has a spring made of flexible plastic material. The spring has a flat elasticity characteristic and cooperates with an adjusting nut and an indicator nut. Pivotable closing levers that cooperate with a profiled abutment sleeve are also provided.

4 Claims, 3 Drawing Sheets

CLAMPING DEVICE FOR LOCKING THE WORKPIECE-CARRYING COLLET IN AUTOMATIC MACHINE TOOLS

The invention relates to an improved clamping device for locking the workpiece-carrying collet in an automatic machine tool.

As is known, in automatic machine tools the bar-shaped workpiece to be machined in an elastically formed clamping collet. The clamping collet consists of an external guiding body and an internal, displaceably arranged sleeve having a plurality of clamping jaws surrounding the workpiece to be clamped circumferentially. Clamping is effected by backward movement of the collet sleeve.

The known clamping collets of this type have external clamping jaws which are arranged in a receiving seat in an external fixed guiding body with a frustoconical seat. With these clamping collets, fairly large locking forces must usually be transmitted, i.e. tractional forces, which lead to disadvantages in the use of these clamping collets.

Thus a clamping collet of the type mentioned has become known, in which the seat of the external guiding body as well as the external shape of the clamping jaws have the configuration of a truncated pyramid. With such a constructional form of the clamping collet, smaller closing and clamping forces are required for the collet, compared to the known collets which have a frustoconical shape.

In addition to a bulky and robust device which must be designed to transmit large clamping forces, the known clamping devices have considerable disadvantages of a structural and functional nature.

The known devices comprise in fact a plurality of movable components cooperating and movable relative to each other by means of sliding surfaces, which results in only a limited efficiency in the transmission of force. In view of the high forces to be transmitted, the known devices have replaceable components, i.e. components which are subject to heavy wear and which frequently must be replaced. An additional reason for the inadequate efficiency in the transmission of force consists in the provision of movable, in particular hinged parts, such as actuating levers, which transform the low-force and long-travel movements into a movement with a large force and small travel. This fact, together with the constructional tolerances to be observed, requires the provision of numerous adjusting devices. With the known bulky clamping devices, mounting of the clamping collet by the operator is time-consuming, not altogether easy and requires numerous adjustments. This requires the use of costly and increasingly less common specialized personnel. Furthermore, resetting of the machine takes a considerable amount of time, which has a negative effect on the productivity of the machine.

The object of the above invention is to improve a clamping device of the type described, so as to avoid thereby the disadvantages of the known clamping devices, the device according to the invention being distinguished by a particularly simplified construction and adjustments by the operator being practically no longer necessary and adjustments being limited to particular applications, for example for the machining of thin-walled tubes or workpieces with a very delicate surface. In this connection, it is the aim of the invention to create a device which operates with smaller closing forces and greater travel, so as to be able to compensate for greater tolerances in the external diameter of the workpieces and so as to be able to machine not only drawn bar stock, as conventional hitherto, but also workpieces made of cheaper rolled material.

The clamping device according to the invention is distinguished moreover by a smaller space requirement and allows easy operation which can be performed even by less-skilled operators. Moreover, the interventions by the operator are reduced to a small number of manual operations, thus reducing considerably the machine setting-up times and correspondingly increasing the productivity of the machine tool.

The object according to the invention is achieved by a clamping device, which is characterized in that:

a) the prestressing spring (3) is formed by a plastic spring having a substantially flat elasticity characteristic, the spring consisting of a sleeve-shaped component inserted in a dish-like component (4), and an abutment disc (5) is provided at the end of the spring (3) opposite the dish bottom (4a), with which disc an adjusting nut (7) cooperates, and moreover an indicator nut (8), which forms the bottom of a pressure sleeve (16) of the traction rod (2), cooperates with the dish bottom (4a) of the receiving dish (4), this pressure sleeve receiving the dish-shaped component (4), the spring (3), the abutment disc (5) and the nut (7), and in that:

b) there is provided a plurality of closing levers (10) hinged at one of their ends (11) on an annular support (11a) and engaged, at their opposite end, with a profiled abutment and positioning sleeve (9), the profiled abutment sleeve (9), consisting of several segments (9a, 9b, 9c) succeeding each other in the axial direction, being engaged with a traction device (21), and the segments forming an abutment for the closing levers (10) depending on the position of the clamping collet or the actual diameter of the workpiece to be clamped, the annular support (11a) cooperating at one end with the dish-like component (4) which receives the spring (3) and cooperating at its other end with a fixed ring (23) on the spindle (24) via rollers (15) which are engaged eccentrically with the closing levers (10).

Further features of the clamping device according to the invention are in the following description.

With the device according to the invention, substantial advantages are achieved. By employing components with rolling bearings and by using clamping levers which are easily operated as well as a prestressing spring with a substantially flat elasticity characteristic, assembly of the collet can be simplified and the clamping operations of the clamping collet can be shortened. Flawless clamping can be performed with the collet by applying small tractional forces.

Adjusting operations, which are necessary for example for adaptation to varying external diameters of the workpieces to be machined, can be performed rapidly and easily. A visual check of the adjustment performed is possible by acting upon a single adjusting nut.

A further advantage of the clamping device according to the invention must be seen in the fact that the machine setting-up times can be reduced substantially by the use of the clamping device according to the invention. A further advantage of the device according to the invention consists in that the individual components are not subjected to very high tractional forces or frictional forces. It is therefore not necessary to provide any wearing parts, and replacement or maintenance of these wearing parts is avoided.

Further features, advantages and details of the device according to the invention are now described in the following description, with reference to the drawings. In the drawings, a preferred embodiment of the device according to the invention is illustrated in schematic form.

Figure 1:
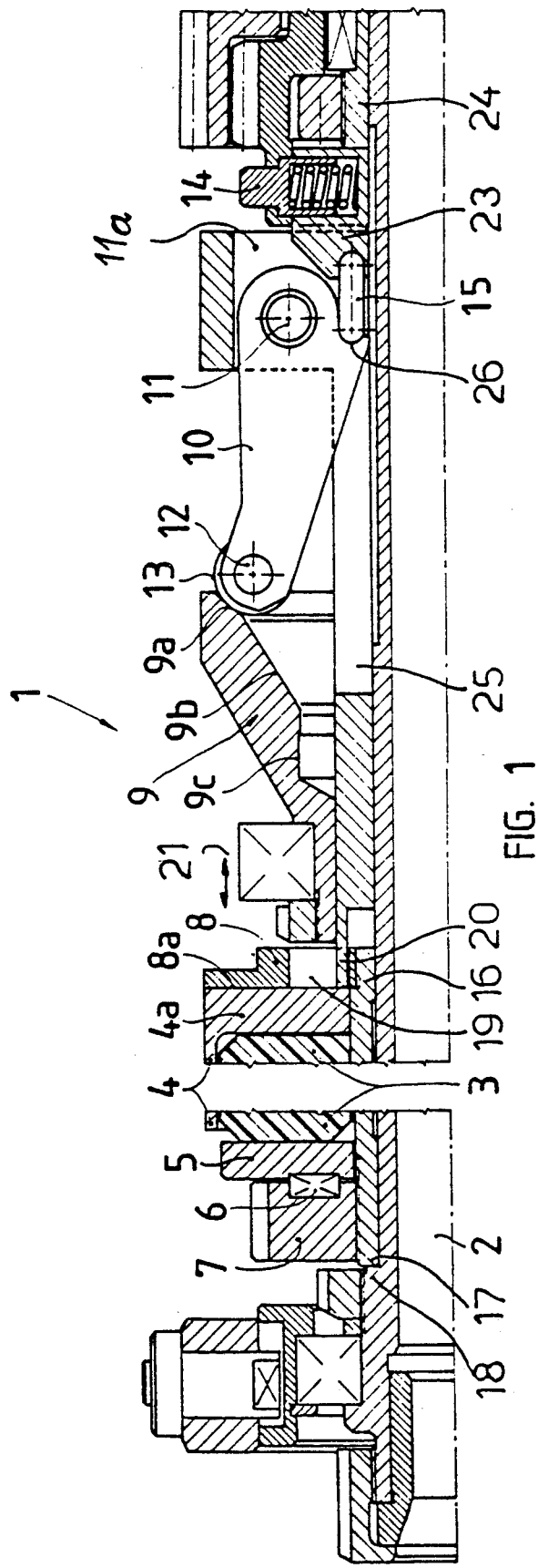
FIG. 1 shows a longitudinal half section of the clamping device according to the invention with the clamping collet open and with a fairly large diameter of the workpiece.

The components are symmetrically constructed; for this reason only half of the device is shown. So that the clamping device according to the invention can be shown in its entirety, the clamping device is shown interrupted at the location of the prestressing spring.

With reference to the accompanying drawings, 1 denotes the traction or clamping device according to the invention for a clamping collet (not illustrated in greater detail) of an automatic machine tool. The hollow collet traction or closing rod is denoted by 2. The components improved in accordance with the above invention relate mainly to the arrangement of the prestressing spring 3 as well as the arrangement of movable parts 10 in the form of levers or tappets for closing, clamping and opening the collet jaws, located after the device on the right-hand side of the drawing.

Figure 3:
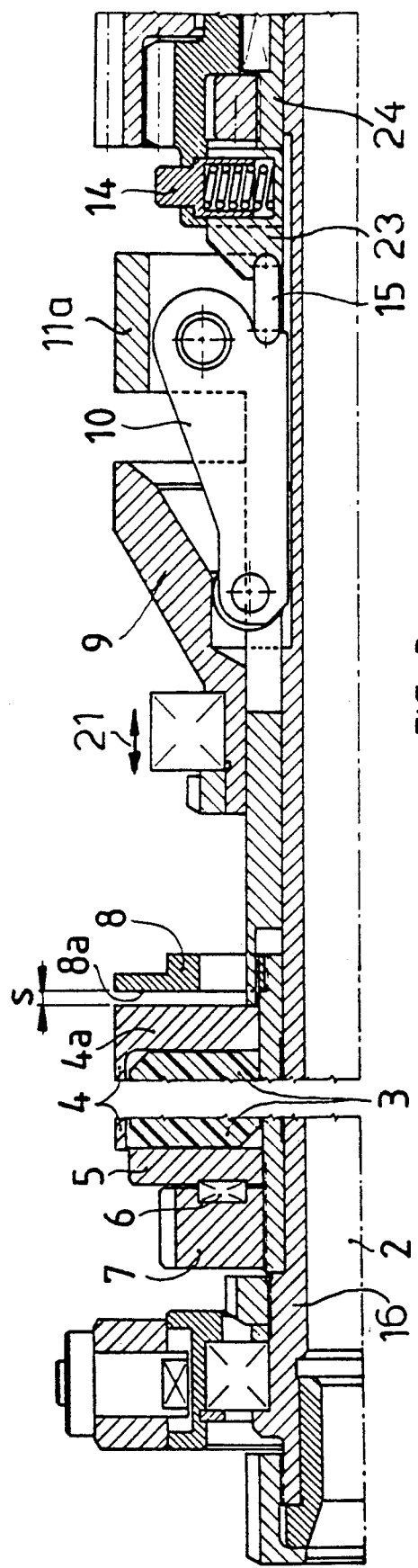
FIG. 3 shows a similar longitudinal half section, with a clamping collet clamped around a workpiece of nominal diameter.

According to the invention, the prestressing spring 3 is made of plastic, for example resilient and, if necessary, expanded polyurethane, instead of the group of cup springs with a very steep elasticity characteristic, conventional hitherto. The spring 3 is advantageously formed as a single piece. The spring is inserted in a dish-like component 4, and the external end of the spring body 3 cooperates with a disc 5. An adjusting nut 7 acts on the disc, with interposition of a crown arrangement of balls or rollers 6. The nut 7 can be screwed onto the pressure sleeve 16. The pressure sleeve 16 is displaceably arranged on the traction rod 2 and receives the disc 5, the spring 3 and the dish-shaped component 4. The pressing end 17 of the sleeve 16 cooperates with the stop 18 of the traction rod 2. Opposite the dish bottom 4a of the receiving body 4 there is arranged a reference nut 8, the side 8a of which directed towards the receiving dish 4 forms a visual indicator by means of direct abutment or by forming a gap denoted by s (FIG. 3).

Figure 2:
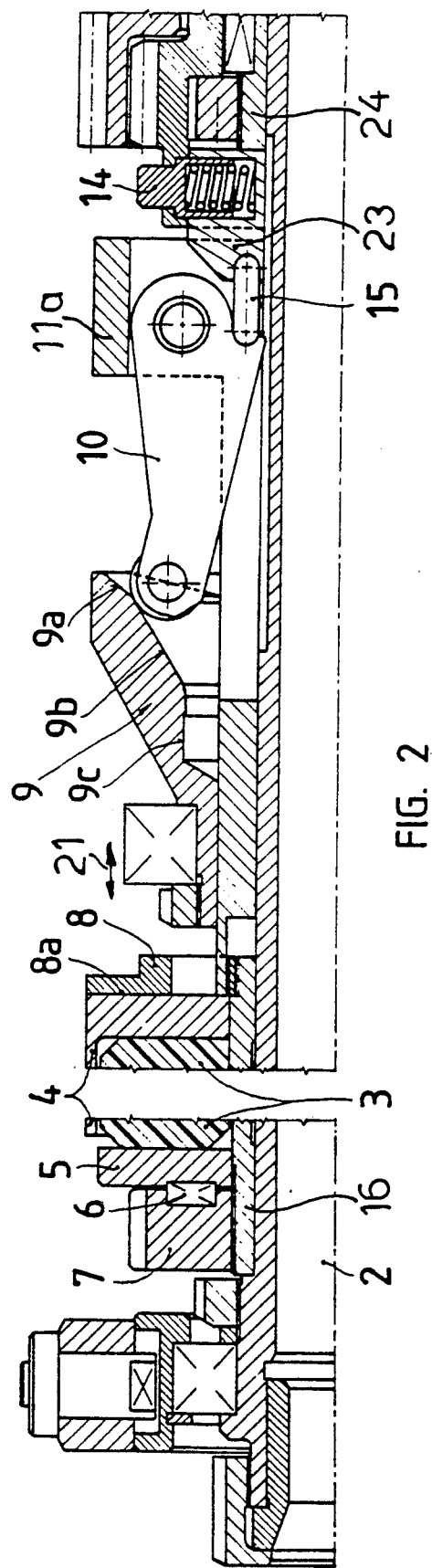
FIG. 2 shows a similar longitudinal half section, with the clamping collet closed for a workpiece of nominal diameter.

For example, in FIGS. 1 and 2, the visual indicator 8a indicates contact between the reference nut 8 and the dish-shaped component 4, whereas, when the collet is clamped (FIG. 3), this visual indicator shows the gap s, the width of which, equal to about 2-4 mm, corresponds to the tolerances applicable for the external diameter of the workpiece to be machined. The nut 8 forms the bottom of the pressure sleeve 16 and has axial openings 19 via which projections 20 of a tubular support 11a abut against the bottom 4a of the dish-shaped component 4.

9 denotes a bell-shaped, circumferentialy extending sleeve with which closing levers 10 (only one shown) cooperate, said lever is hinged at one end, as shown at the point 11, on the support 11a and supports, at its opposite other end 12, a roller 13. 9a, 9b and 9c denote the individual portions of the profiled abutment sleeve 9. The levers 10 engage with these portions depending on whether the collet is in the open, closed or clamped position. Thus, for example, the portion 9a of the abutment sleeve engages with the levers 10 in the open condition of the collet or the diameter of the workpiece is greater than a nominal diameter by 0.8 mm, for example. Engagement occurs between the levers 10 and the abutment portion 9b when the clamping collet is closed and the workpiece has the nominal diameter or a diameter which is, for example, 0.5 mm smaller than the nominal diameter. Engagement occurs between the closing levers 10 and the portion 9c when the clamping collet is clamped on a workpiece with the nominal diameter or a diameter which is, for example, 0.5 mm smaller than the nominal diameter. In the embodiment described, different distances of the gap s correspond to the different actual diameters of the workpieces to be clamped. In the case of workpieces with the nominal diameter, the gap s has the greatest value, for example 3.5 mm, while in the case of increasingly smaller diameters this value of the gap s decreases, so that the gap s has a value of 2.6 mm in the case of a diameter 0.5 mm smaller than the nominal diameter.

The values mentioned represent guide values which can be readily modified depending on the dimensions of the device, envisaged in each case for the device according to the invention. 14 denotes a known release device and 15 a cage of rollers.

The rollers 15 are arranged between the fixed disc 23, against the spindle 24, and the seat 26 of the levers 10. The seat 26 is eccentrically arranged with respect to the pivot point 11. The spindle 24 receives in a known manner the sleeve of the clamping collet (not shown) which is connected to the hollow traction rod 2. The levers 10 pivot into openings 25 of the tubular support 11a. Two opposing levers 10 are provided for example.

The known traction device is represented schematically by the double arrow 21 and is engaged with the bell-shaped sleeve 9.

Clamping of the collet (not shown) around the workpiece (not shown) in the hollow traction rod 2 occurs as follows: the traction device 21 pushes the profiled component 9 against the levers 10, i.e. towards the right in the drawing. The levers 10 slide along the segments 9a, 9b and 9c and pivot in an anti-clockwise direction and exert a transverse force on the fixed ring 23 via the roller cage 15.

Since the ring 23 is not displaceable, displacement of the tubular support 11a occurs. The latter is displaced on the traction rod 2. During this displacement to the left, displacement of the dish-shaped component 4 is effected with the projections 20 and displacement of the disc 5 as well as the nut 7 also occurs as a result of compression of the spring 3. The nut 7 is screwed onto the pressure sleeve 16 and moves, with its end 17, the traction rod 2 to the left. The traction rod 2 thus pulls the clamping sleeve (not shown) of the clamping collet into the external guiding body, thereby resulting in closure of the collet jaws around the workpiece. Opening of the collet occurs with the opposite sequence of movements. The extent of the pivoting movement of the levers 10 is dependent on the external diameter of the workpiece to be clamped.

With a clamping device for the clamping collet according to the invention, travel movements of the order of magnitude of about 25 mm can be obtained. This can be achieved by the use of the device described and the employment of a spring made of plastic having a relatively flat elasticity characteristic. It is thus possible to clamp properly workpieces whose diameters deviate substantially from the nominal diameter. Further known components of the device were not described for the sake of simplicity.

From the structure of the device and the mode of operation described it can be seen that, with the proposed clamping device for a clamping collet, the object according to the invention is fully achieved and the advantages mentioned are obtained. In practice, individual parts may be replaced by other components which are technically or functionally equivalent, without departing from the protective scope of the above invention.

With the above invention, in addition to a considerable reduction in the machine setting-up times, the elasticity of the clamping collets is used to greater effect, i.e. with one and the same clamping collet it is possible to clamp bars with widely varying external diameters, resulting in less frequent replacement of the collet.

The end portion of the traction rod cooperating with the clamping collet is formed as a rapid-action closure, for example using a connection thread which has segment-like milled incisions. The features contained in the description, the drawing and the claims are essential for the above invention both individually and in combination with each other.

I claim:

1. In a clamping device for locking a workpiece-carrying collet in an automatic machine tool, the clamping device having a movable traction device (21) and linkage means (1) moving a traction rod (2) with the movement of the traction device for collet closing, clamping and opening operations, the improved linkage means (1) comprising:
    a plastic prestressing string (3) having a relatively flat elasticity characteristic, the spring consisting of a sleeved-shaped component;
    a dish-like component (4) having a bottom (4a) that receives one end othe the spring (3);
    a disc (5) abutting an opposite end of the spring (3);
    a pressure sleeve (16) that extends through the spring (3), dish-like component (4) and disc (5) and about a traction rod (2), one end (17) of the pressure sleeve (16) engaging a stop (18) on the traction rod (2) for moving it;
    an adjusting nut (7) on the one end of the pressure sleeve (16) and engaging the disc (5);
    an indicator nut (8) on an opposite end of the pressure sleeve (16) and cooperative with the bottom (4a) of the dish-like component (4);
    an annular support (11a) about the traction rod (2);
    a profiled abutment and positioning sleeve (9) about the annular support (11a), the sleeve (9) having successive segments (9a, 9b, 9c) in the axial direction and engaging a traction device (21) for movement thereby; and
    a plurality of closing levers (10) spaced circumferentially about the annular support (11a), each closing lever being hinged at one end (11) on the annular support (11a), the segments of the sleeve (9) forming an abutment for the opposite ends of the closing levers (10) in dependence on the position of a clamping collet and the actual diameter of a workpiece to be clamped thereby,
    the annular support (11a) cooperating at one end with the bottom (4a) of the dish-like component (4) and at its opposite end with a ring (23) fixed on a spindle (24) via rollers (15) which eccentrically engage the closing levers (10).

2. The clamping device according to claim 1, and further comprising a roller bearing (6) between the adjusting nut (7) and the disc (5).

3. The clamping device according to claim 1, and further comprising friction-reducing rollers (13) respectively on the opposite ends of the closure levers (10) for cooperating with the sleeve (9).

4. The clamping device according to claim 1, and further comprising an end portion of the traction rod (2) for receiving a sleeve of a clamping collet, the end portion being formed as a rapid-action closure.

* * * * *